Jan. 14, 1958    M. L. EDWARDS    2,819,843
MIXING VALVE
Filed July 16, 1954    2 Sheets-Sheet 1
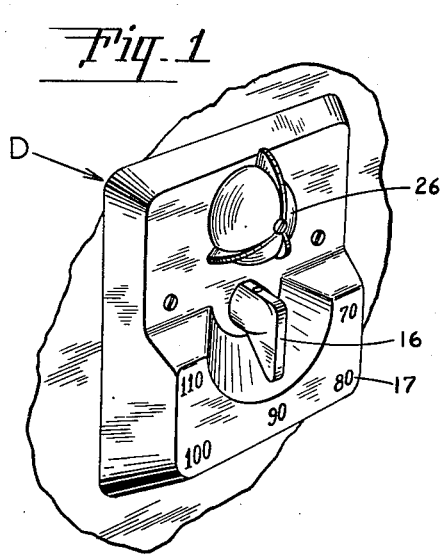
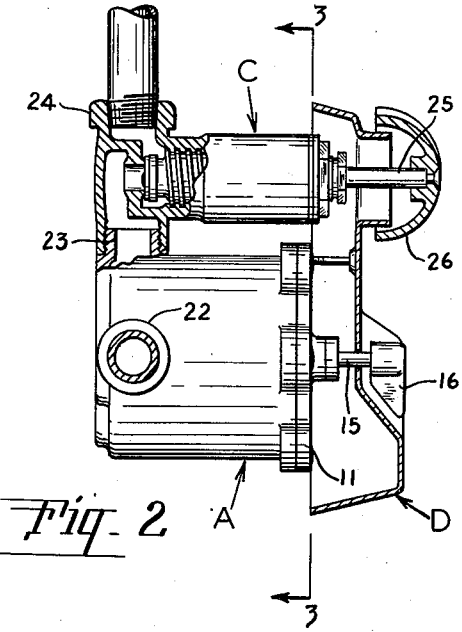
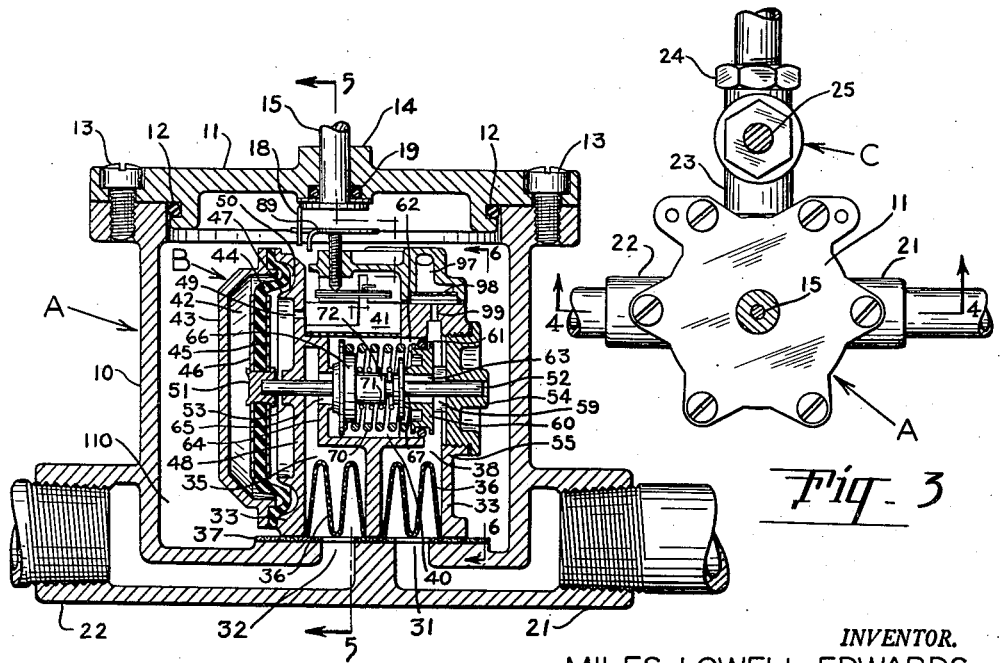
INVENTOR.
MILES LOWELL EDWARDS
BY
Cook and Schermerhorn
ATTORNEYS Jan. 14, 1958
M. L. EDWARDS
2,819,843
MIXING VALVE
Filed July 16, 1954
2 Sheets-Sheet 2
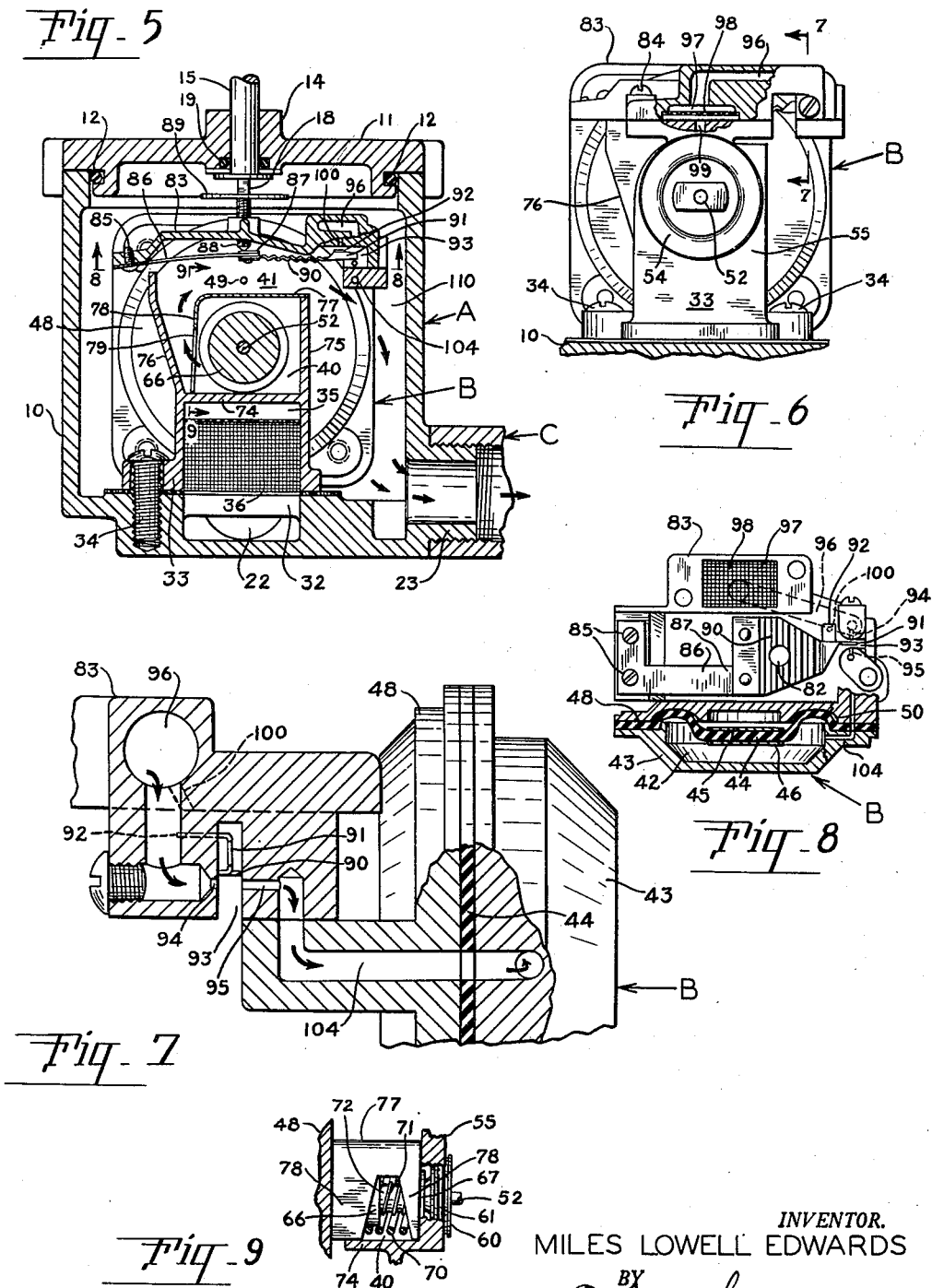
INVENTOR.
MILES LOWELL EDWARDS
BY
Cook and Schermerhorn
ATTORNEYS United States Patent Office 2,819,843
Patented Jan. 14, 1958

2,819,843

MIXING VALVE

Miles Lowell Edwards, Portland, Oreg.

Application July 16, 1954, Serial No. 443,727

8 Claims. (Cl. 236—12)

This invention relates to a device for mixing different fluids, such as hot and cold liquids, in variable ratio to maintain a desired characteristic or condition, such as constant temperature, in a flow of the mixture. The invention relates more specifically to improvements in the type of device illustrated and claimed in my prior patent, No. 2,655,316, issued October 13, 1953, and entitled Mixing Valve.

In my prior patent the hot and cold liquids are first introduced to each other at the junction of two conduits which continue as a single short conduit leading to a sensing chamber containing a thermostatic element. After flowing through the sensing chamber the mixture enters a relatively larger blending chamber for more thorough mixing before proceeding through a discharge valve and discharge pipe which carries the mixture to its intended destination. Fluid motor actuated inlet valves are controlled by the thermostatic element to admit hot and cold liquids to the respective conduits. The length of conduits between the valves and the sensing chamber produces instability, causing the thermostatic element and the valves to pulsate at a frequency and amplitude that will admit pulses of the proper amounts of hot and cold liquids to produce the desired resultant temperature of the mixture leaving the blending chamber. Such pulsation or "hunting" is continuous because the sensing chamber is alternately filled with hot and cold liquids in quick succession. The oscillation rate of the thermostatic element and inlet valves is sufficiently high to limit each pulse to a relatively small volume of liquid, whereby the hot and cold pulses of liquid are mixed to a constant temperature in the blending chamber and do not appear as hot and cold pulses in the discharge pipe. Difficulty is experienced, however, in maintaining a constant temperature at different rates of discharge.

The general object of the present invention is to improve the mechanical structure and control action of the type of device disclosed in my prior patent.

More specific objects are to provide a compact and inexpensive mixing valve having all the operating parts contained within a single small pressure resistant housing, to incorporate the whole mechanism in a body which is removable as a unitary assembly from such a housing, to provide a mixing device having inlet valves opening directly into a common entrance chamber closely adjacent the sensing chamber in order to minimize the time lag in the control effects caused by flow time from the inlet valves to the sensing element, and to provide means for compensating the control mechanism for variations in the fluid pressure at different rates of flow.

Another object is to provide an improved diaphragm enclosure for a servo-motor diaphragm.

An important feature of the present construction is the enclosure of all the operating mechanism within a single housing structure of sufficient strength to withstand the fluid supply pressure, thereby eliminating the need for a plurality of separate pressure resistant housings for different components of the device, and also eliminating various conduits and conduit connections which must also be made leak-proof and strong enough to withstand the supply pressure. In the present construction, the whole operating mechanism is incorporated in a body which fits in the housing structure and is readily removable therefrom for repair or replacement. In this body a common entrance or confluence chamber occupies a space immediately between the hot and cold inlet valves whereby the two flows are conveyed in a common channel and are not allowed to proceed for a distance in separate channels before making contact with the condition responsive element. The sensing chamber containing the condition responsive element is downstream from the confluence chamber but not remote from the inlet valves. This results in a simpler, more compact and less expensive form of construction which does not require any auxiliary plumbing in addition to the necessary connections for the fluid supply pipes and the discharge pipe.

Another important feature of the present invention is the provision of a compensating jet acting on the condition responsive element to change the position of the latter with changes in water pressure resulting from various degrees of opening of the discharge valve, so that the fluid pressure control mechanism, and hence the final condition of the mixture, will not be affected by the rate of flow.

These and other objects and advantages will become apparent and the invention will be better understood with reference to the following detailed description of the preferred embodiment illustrated in the accompanying drawings. It is to be understood, however, that various changes may be made in the construction and arrangement of parts within the scope of the appended claims, and that certain features may be used without others, without departing from the spirit of the invention. The description relates to a thermostatic mixing valve for hot and cold water but the broad principles of the invention are applicable to fluids other than liquids and controllable conditions other than temperature.

In the drawings:

Figure 1 is a perspective view showing the escutcheon plate and control handles for the present device;

Figure 2 is a side elevation view of the device with certain parts shown in section;

Figure 3 is an elevation view looking from the front of the device, taken on the line 3—3 of Figure 2;

Figure 4 is a sectional view taken on the line 4—4 of Figure 3;

Figure 5 is a sectional view taken on the line 5—5 of Figure 4;

Figure 6 is a view taken on the line 6—6 of Figure 4, with certain parts broken away;

Figure 7 is an enlarged fragmentary view taken on the line 7—7 of Figure 6;

Figure 8 is a sectional view taken on the line 8—8 of Figure 5; and

Figure 9 is a sectional view taken on the line 9—9 of Figure 5.

The principal parts of the present device comprise a pressure resistant outer housing A, a control mechanism assembly B, a flow control valve C, and an escutcheon plate D. In the illustrated embodiment these parts are designed for use as a hot and cold water mixing valve for a bathroom, laundry room or kitchen. All of these parts are shown in Figure 2 except the control assembly B which is best illustrated in Figures 4 and 5.

The outer housing A preferably comprises a bronze casting 10 having an open front side closed by a front plate 11 which is equipped with suitable sealing means 12 and secured in place by means of screws 13. The front plate 11 has a central bearing boss 14 for a temperature adjusting shaft 15 connected with a temperature adjusting knob 16 on the front of escutcheon plate D. Disposed in an arc around the knob 16 is a temperature scale 17. The inner end of shaft 15 is equipped with an eccentric lug or crank element 18 for cooperation with the mechanism of assembly B. Plate 11 is further provided with a shaft seal 19 to prevent leakage around the shaft 15.

The rear side of housing A is provided with a cold water connection 21, a hot water connection 22, and a mixture discharge connection 23. Flow control valve C is attached to discharge connection 23, and is in turn equipped with its own discharge connection 24 through which the temperature and volume controlled flow of mixture may be connected with plumbing fixtures, such as a bath tub, shower spray, wash basin, laundry tray, sink, or other equipment requiring a supply of temperature controlled water. The shaft 25 of valve C projects through an opening in the escutcheon plate D and is equipped with a valve handle 26, as shown in Figures 1 and 2.

Cold water connection 21 communicates with a cold water port 31, and hot water connection 22 communicates with a hot water port 32 in the rear side of housing A. The control mechanism B is mounted on and incorporated in a body member 33 which is secured to the interior of the back wall of housing A by means of screws 34, as shown in Figure 5. By removing the screws 34 and the front plate 11, the control mechanism assembly B is removable from the housing A as a unit. The body member 33 contains walls forming a cold water inlet chamber 38 communicating with the port 31, and a hot water inlet chamber 35 communicating with the port 32. Filter screens 36 are disposed in these inlet chambers and a gasket 37 may be employed to seal the joints between the frame 33 and the back wall of housing A.

The body member 33 also has walls defining a valve chamber 40, which functions in the present device as a central entrance or confluence chamber, and walls defining a sensing chamber 41, as best shown in Figures 4 and 5. The body member 33 also carries a diaphragm chamber 42 enclosed on one side by a plate 43. The other side of the diaphragm chamber is closed by a soft rubber diaphragm 44 contained between a pair of rigid circular diaphragm plates 45 and 46 to prevent severe stress on the flexible material of the diaphragm under high liquid pressures. When the diaphragm moves to the right in Figure 4 the rigid diaphragm plate 45 approaches a circular rim 47 on a wall 48 of the body member 33. The peripheral edge of the diaphragm is clamped between plate 43 and an annular surface on the wall 48. An aperture 49 in the wall 48 maintains communication between the sensing chamber 41 and the space between the diaphragm and wall 48.

In the event of extreme pressure in the diaphragm chamber 42 at a time when the pressure is relatively low in sensing chamber 41, the plate 45 will support the principal area of the flexible diaphragm material to prevent damage to the material. Radially outwardly from the circular rim 47 the wall 48 forms an annular groove 50 to support the annular flexing portion of the diaphragm 48 against any amount of unbalanced pressure which may exist in diaphragm chamber 42. The wall of the groove 50 extends from the rim 47 to the clamped peripheral edge of the diaphragm whereby no portion of the diaphragm material is unsupported against the pressure in diaphragm chamber 42 when the diaphragm is pressed toward wall 48. This permits the diaphragm to be made very flexible and sensitive to small pressure variations which would produce less movement in a stiffer diaphragm of conventional construction.

Diaphragm plates 45 and 46 carry a central thrust button 51 receiving one end of a valve push rod 52. A boss 53 in the wall 48 provides a guide bearing for this end of the push rod. The other end of valve push rod 52 is supported in a removable circular bearing plate 54 having screw thread mounting in an opposite end wall 55 of the body member 33.

The valve push rod bearing plate 54 is equipped with a pair of struts 59 supporting a circular port plate 60. The periphery of port plate 60 is equipped with a sealing ring 61 frictionally engaging a short cylindrical wall 62 in the frame 33 whereby the port plate 60 is removable with the bearing plate 54, the plate 60 being smaller in diameter than plate 54. Thus the outer plate 54 provides a wall closure between inlet chamber 38 and the space within housing A, and plate 60 provides a wall between this inlet chamber and entrance chamber 40. Port plate 60 has a circular port 63 concentric with valve push rod 52 communicating on one side with cold water inlet chamber 38 and on the other side with the entrance chamber 40. At the other end of the entrance chamber 40 is a port wall 64 having a circular port 65 concentric with the valve push rod 52 communicating with the hot water inlet chamber 35.

A hot water valve disc 66 is fixedly mounted on the push rod 52 to cooperate with the port 65 and a cold water valve disc 67 is slidably mounted on the push rod to cooperate with the port 63. A hot water valve spring 70 is placed under compression between the port plate 60 and the valve disc 66 to urge the latter toward closed position relative to the port 65. A cold water valve spring 71 abuts against the valve disc 66 and engages the valve disc 67 to urge the latter normally toward closed position with respect to the cold water port 63. The hot water valve spring 70 is strong enough to hold the valve 66 closed against water main pressure in the inlet chamber 35 whereby this valve can be opened only by the action of diaphragm 44. The spring 71 is a relatively light spring which will allow the valve disc 67 to open the port 63 when a pressure differential exceeding about five pounds per square inch exists between the cold water inlet chamber 38 and entrance chamber 40. Valve disc 67 has a sliding fit on push rod 52 so that the leakage between this valve disc and the push rod is negligible. In order to facilitate assembly and disassembly, the valve push rod 52 is preferably not permanently attached to the thrust button 51 in the diaphragm, but is merely received in a shallow bore in the thrust button 51. Thus, by removing the unitary screw plate 54 and port plate 60, the whole valve assembly may be withdrawn from the body member 33.

Valve disc 66 has a hub or boss 72 projecting toward valve disc 67 and spaced therefrom a disatnce slightly less than the distance between diaphragm plate 45 and rim 47 when both valves are in closed position as shown in Figure 4. Thus, the position of valve 66 determines the amount that valve 67 can open. When valve 66 is closed, valve 67 can open fully but, as valve 66 starts to open, the movement of valve 67 is restricted. When valve 66 is fully open, valve 67 is pressed closed by boss 72 and diaphragm plate 45 is spaced about .010 inch from abutment rim 47.

Referring now to Figure 5, it will be observed that two sides of the entrance chamber 40 are defined by a back wall 74, and a top wall 75. A divergent bottom wall 76 is connected with back wall 74, these positions being referred to the orientation of the device shown in Figure 2 where the discharge connection 24 is turned upward to connect with a shower spray, for example. A front baffle or shield 77 connects with the top wall 75 and separates the entrance chamber 40 from the sensing chamber 41. Baffle 77 bends around the lower side of entrance chamber 40 in spaced relation to the divergent bottom wall 76 and has forked portions 78 providing an opening 79 for discharge of the hot and cold water from the entrance chamber 40 through the sensing chamber 41 as it proceeds to the discharge connection 23. The purpose of this baffle is to prevent high velocity streams of water from impinging forcibly upon the condition responsive element in sensing chamber 41 when the valves are in throttling position.

The front wall of the sensing chamber 41 is defined by a plate-like body member 83 which is secured to the body member 33 by screws 84, as shown in Figure 6. Attached to the plate 83 by means of screws 85 is an elongated spring metal strip 86 having a free end 87 biased to bear against the end of an adjusting screw 88. Screw 88 is threadedly engaged with the plate 83 and has a slotted head 89 engaged by the eccentric lug or crank element 18 of the temperature adjusting shaft 15. The arrangement is such that the lug 18 is withdrawn from engagement with the screw head 89 when the front plate 11 is removed from the housing A.

Mounted on the free end 87 of strip 86 is a condition responsive element in the form of a corrugated bimetallic strip 90 having a free end equipped with a vane 91 disposed perpendicular to the general plane of the main portion of the strip 90. Another portion of the strip 90 forms a small blade 92 perpendicular to the vane 91 and parallel to the general plane of the main portion of the strip 90. Bimetallic strip 90 is apertured at 82 to facilitate the circulation of liquid around both sides of the strip and equalize hydrostatic forces on its opposite sides.

The vane 91 is disposed in a narrow slot 93 in the plate 83. One wall of the slot 93 contains a nozzle orifice 94 and the opposite wall contains an aligned receiving orifice 95. Warping of the bimetallic strip 90 in response to temperature variation moves the vane 91 perpendicular to the axis of the nozzle and receiving orifice so that under certain conditions the vane may intercept a jet of liquid from the nozzle aimed at the receiving orifice. When the temperature is falling, the vane 91 moves upwardly in Figures 5 and 7 and when the temperature is rising the vane moves downwardly, with respect to the orientation of these particular views in the drawings.

The nozzle 94 is connected with a passage 96 leading from a filter chamber 97 equipped with a filter screen 98. A passage 99 connects the filter chamber with cold water inlet chamber 38 in Figure 4. A nozzle 100, also communicating with the passage 96, directs a compensating jet against the blade 92. A passage 104 contained partly in the plate 83 and partly in the body 33 and diaphragm housing plate 43 connects the receiving orifice 95 with diaphragm chamber 42.

By reason of the small dimensions of nozzle 94 and receiving orifice 95, a very minute movement of the vane 91 downwardly from its Figure 5 position is sufficient to deflect a portion or all of the nozzle jet away from the receiving orifice. When a jet from nozzle 94 impinges upon orifice 95 substantially the full pressure of inlet chamber 38 is established in diaphragm chamber 42 but, when vane 91 intercepts the jet, the orifice 95 transmits the lower pressure in sensing chamber 41 to the diaphragm chamber. When the vane, in moving back and forth between intercepting and non-intercepting positions, merely brushes an edge of the jet an average intermediate pressure is transmitted. Satisfactory results have been obtained in a mixing valve for hot and cold water where the nozzle and receiving orifice 94 and 95 are each .025 inch in diameter, the width of the slot 93 is .060 inch and the thickness of vane 91 is .010 inch. Vane 91 is positioned midway between the walls of the slot 93 so that it is free to move without rubbing contact against any solid surface and so that it will not close orifice 95 against communication with sensing chamber 41. The foregoing dimensions are cited merely by way of example and are not intended to limit the invention.

In the present construction the outer housing A forms a blending chamber 110 surrounding the control assembly B and sustaining the water main pressure. There are no severe strength requirements in the body member 33 as a whole. Control assembly B may, therefore, be made compactly and inexpensively to provide the desired degree of sensitivity. The only portions of control assembly B required to have sufficient strength to sustain full water main pressure are the inlet chambers 38 and 35, the small passages and chamber communicating with the nozzles 94 and 100, and diaphragm chamber 42. The confluence chamber 40, sensing chamber 41 and the space between wall 48 and diaphragm 44 communicate at all times with the interior of housing A and are not subject to a significant pressure differential with respect to the blending chamber 110.

Operation

When the flow control valve C is shut off, water main pressure is established throughout all the chambers and passages in housing A and control assembly B. Thus the pressure is balanced on both sides of diaphragm 44 and hot water valve spring 70 holds the hot water valve 66 seated against the port 65 and diaphragm plate 45 spaced from rim 47. Cold water valve spring 71 holds cold water valve 67 seated against the port 63. No jets flow from nozzles 94 and 100. This condition of the mechanism is illustrated in Figure 4.

In use, the temperature regulating knob 16 is turned to a desired temperature indication on scale 17 and the flow control valve 26 is opened. This reduces the pressure in the mixing chamber 40, allowing the cold water pressure in inlet chamber 38 to force open cold water valve 67 against the five pound spring 71 and admit cold water into entrance chamber 40. Water main pressure is ordinarily at least twenty pounds per square inch, and usually considerably greater. Hot water valve spring 70 maintains a closing force against the hot water valve 66 superior to the opening force applied by the hot water pressure, and so the hot water valve remains closed for an instant after flow control valve C is opened. Boss 72 stops the opening movement of valve 67 in its full open position.

The action of spring 71 on cold water valve 67 maintains at all times, when valve C is open, a pressure differential of at least five pounds per square inch between the water pressure in cold water inlet chamber 38 and the entrance chamber 40. This pressure differential causes jets of water to issue from the nozzles 94 and 100. The cold water flowing out of entrance chamber 40 and passing through the sensing chamber 41 in contact with the bimetallic element 90 causes the vane 91 to assume a position at a slight distance from the jet from nozzle 94. This jet impinges with its full force in the receiving orifice 95 to establish a pressure in diaphragm chamber 42 approximately five pounds per square inch greater than the pressure communicated to the other side of the diaphragm through orifice 49. This superior pressure in the chamber 42 is sufficient to move the diaphragm and valve push rod 52 against the force of spring 70 to open the hot water port 65 and admit hot water into entrance chamber 40 which then begins to function as a confluence chamber. The opening movement of hot water valve 66 closes cold water valve 67 a corresponding amount.

As soon as the resulting mixture reaches the bimetallic strip 90, the strip assumes a new shape, moving the vane 91 toward intercepting position between nozzle 94 and receiving orifice 95. When the receiving orifice is entirely shielded from the jet, the pressure at the orifice entrance immediately drops to the value of water pressure in the sensing chamber 41, allowing the liquid contained in passage 104 and diaphragm chamber 42 to be expelled by the action of spring 70 as the spring returns the hot water valve 66 toward closed position. This reverse flow from the receiving orifice is illustrated and described in detail in my prior patent, above referred to.

If the hot water is entirely or substantially shut off before the resulting colder mixture reaches the bimetallic strip 90 and produces responsive movement of vane 91, the device will "hunt," or oscillate, at a rather rapid rate, as described in my prior patent. This will produce satisfactory control of the mixture because the resulting pulses or slugs of hot and cold water are so small in volume that they have ample opportunity to become thoroughly mixed in the blending chamber 110 of housing A and also in the discharge pipe leading to the plumbing fixture. However, the frequency of oscillation in the present construction is greatly increased because the bimetallic condition responsive element 90 is so close in stream flow distance to the hot and cold water valves 66 and 67. It is theoretically possible, under certain conditions of temperature and flow, for the vane 91 to assume a fairly stable brushing position relative to the jet from nozzle 94 which will produce some pressure in the diaphragm chamber 42 intermediate between the pressure in cold water inlet chamber 38 and the approximately five pound lower pressure in the sensing chamber that will cause the diaphragm 44 and valves to assume an intermediate position blending the water mixture to approximately the desired temperature with a minimum of hunting. However, in practice, it is found that under most conditions the thermostat and valves do oscillate but at such a rapid rate that the alternate pulses or slugs of hot and cold water are quite small in volume and can be blended to a uniform output temperature in a relatively small blending chamber.

It is apparent that a very minute movement of the intercepting edge of vane 91 across the jet is all that is necessary to produce a considerable variation in pressure in the diaphragm chamber 42 whereby the valves 66 and 67 are not necessarily required to oscillate the full distance between closed and wide open positions but can exert their intended control effect by a lesser modulating movement in an intermediate portion of their full range of movement. For this reason, the concept in my prior patent of mixing distinct pulses of hot and cold water is not as effective in the present device, and so a large blending chamber downstream from the sensing chamber is not required. The free space in housing A provides a blending chamber of ample capacity. The reduced valve movement in the present device also has the advantage of producing less wear and tear on the operating parts.

The purpose of the compensating nozzle 100 is to prevent a change in the position of the vane 91 which is required to maintain a given temperature of mixture when the water pressure in housing A is greatly decreased by opening wide the flow valve C. Without the compensating jet from nozzle 100, the temperature of the mixture would change with different adjustments of the rate of flow. The reason for this will be apparent when it is remembered that the source of pressure acting on diaphragm plate 46 in diaphragm chamber 42 comes from the cold water inlet chamber 38. As the opening of valve C is increased, the pressure acting on diaphragm plate 45 may become lower, tending to shift the position of diaphragm 44 to the right in Figure 4, which is in the direction of opening movement of hot water valve 66 and closing movement of cold water valve 67, thereby producing a hotter mixture as the rate of flow is increased. When valve C is wide open the pressure in housing A becomes quite low. At this time a pressure in the diaphragm chamber 42 will completely close the cold water valve 67 and cause the differential pressure at nozzle 94 to increase greatly in excess of five pounds per square inch. It may increase to an amount equal to the maximum pressure obtainable from the cold water supply. As this occurs, the added force of the jet from nozzle 94 will disturb the temperature setting of the valve and change the temperature of the mixture. Compensating nozzle 100 corrects such error.

In the present improved construction the position of vane 91 is continuously influenced by the jet from compensating nozzle 100. The force exerted by this jet against the blade 92 depends upon the pressure difference existing between the passage 96 and the sensing chamber 41. When the flow control valve C is opened wide, this pressure difference is a maximum and the vane 91 is deflected by the compensating jet toward the axis of nozzle 94 a maximum amount. As the valve C is closed, the pressure difference between passage 96 and the sensing chamber 41 diminishes, reducing the force applied by the compensating jet against blade 92 and allowing the mean position of the vane 91 in its hunting movements to move slightly away from the axis of nozzle 94. If the vane 91 is visualized as being poised in brushing engagement with the jet from nozzle 94, the compensating movement then reduces the portion of the jet entering orifice 95 when the pressure falls in sensing chamber 41 and increases the portion of the jet entering the orifice when the pressure rises in the sensing chamber. Thus the pressures on opposite sides of the diaphragm 44 remain balanced during pressure variations in the sensing chamber and the diaphragm responds only to temperature change.

Whenever the rate of flow changes, the mean position of vane 91 in its hunting movements is shifted slightly, relative to the axis of nozzle 94, by the jet from compensating nozzle 100 to maintain the same volume ratio between the hot and cold pulses of water at different sensing chamber pressures. Thus, by reason of the compensating nozzle 100, the present device maintains a constant temperature of the mixture independent of rate of flow and valve oscillation and the flow may be adjusted through a wide range without disturbing the temperature.

Having now described my invention and in what manner the same may be used, what I claim as new and desire to protect by Letters Patent is:

1. A fluid mixing device comprising a pressure resistant housing, fluid supply connections in said housing, a fluid discharge connection in said housing, a body member mounted in said housing, a central confluence chamber in said body member, inlet chambers on opposite sides of said confluence chamber communicating with said fluid supply connections in said housing, port and valve means in said confluence chamber for admitting fluids from said inlet chambers, a diaphragm chamber mounted on said housing, a diaphragm in said diaphragm chamber connected with said valve means, a sensing chamber communicating with said confluence chamber and said discharge connection in said housing, an orifice in said body member communicating with said diaphragm chamber, a nozzle in said body member connected with one of said inlet chambers, a thermostatic element in said sensing chamber having a vane movable between said nozzle and orifice, a surface on said element perpendicular to said vane, and a nozzle connected with said one of said inlet chambers directed toward said surface in a direction to cause a jet from said nozzle to move said vane toward said orifice.

2. A fluid mixing device comprising a pressure resistant housing, fluid supply connections in said housing, a fluid discharge connection in said housing, a body member in said housing having a confluence chamber, ports equipped with valve means in said confluence chamber, inlet chambers in said body member communicating with said ports and said fluid supply connections, a fluid pressure operated servo-motor mounted on said body member for operating said valve means, a sensing chamber in said body member communicating with said confluence chamber, a condition responsive element in said sensing chamber utilizing the fluid pressure in one of said inlet chambers for controlling the fluid pressure in said servo-motor, and a nozzle connected with said one inlet chamber and arranged to direct a fluid jet against said condition responsive element in a direction to reduce the fluid pressure in said servo-motor to compensate for variations in fluid pressure in said sensing chamber.

3. In a fluid mixing device having a variable pressure drop through the device, valve means for controlling the flows of different fluids, a diaphragm chamber having a diaphragm connected with said valve means, one side of said diaphragm being exposed to the pressure in said chamber and the other side of said diaphragm being exposed to the pressure of the mixed fluids, an orifice connected with said diaphragm chamber, a nozzle connected with the source of one of said fluids directed toward said orifice, a condition responsive element transversely exposed to a flow of said fluids from said valve means, a vane movable by said condition responsive element between said nozzle and orifice, and means for compensating for variations in pressure of said one fluid comprising a blade connected with said vane and disposed in a plane perpendicular to said vane, and a nozzle connected with said source of said one fluid directed toward said blade in a direction to cause a jet from said nozzle to move said vane toward said orifice.

4. A fluid mixing device comprising inlet chambers for the fluids to be mixed, valve means communicating with said inlet chambers, a diaphragm chamber having a diaphragm connected with said valve means, one side of said diaphragm being exposed to the pressure in said chamber and the other side of said diaphragm being exposed to the pressure of the mixed fluids, a condition responsive element exposed to a flow of the fluids from said valve means, a nozzle connected with one of said inlet chambers, an orifice aligned with said nozzle connected with said diaphragm chamber, a vane movable by said condition responsive element transversely between said nozzle and orifice to intercept a jet from said nozzle directed into said orifice, a blade connected with said vane and disposed in a plane perpendicular to said vane, and a nozzle connected with said one inlet chamber directed toward said blade in a direction to cause a jet from said nozzle to move said vane toward the axis of said orifice and first nozzle.

5. In a hot and cold liquid mixing device, valves for controlling the flows of said hot and cold liquids, a liquid pressure operated control unit comprising a diaphragm servo-motor unit having a diaphragm chamber and a diaphragm connected with said valves, one side of said diaphragm being exposed to the pressure in said chamber and the other side of said diaphragm being exposed to the pressure of the mixed fluids, an orifice member having an orifice connected with said diaphragm chamber, a nozzle connected with the source of one of said liquids aligned with said orifice, a bimetallic thermostatic strip exposed to the flow of said liquids from said valves, a vane connected with said bimetallic strip movable transversely between said nozzle and orifice, a surface on said strip disposed perpendicular to said vane, and a nozzle connected with said liquid source directed toward said surface in a direction to cause a jet from said nozzle to move said vane toward the axis of said orifice and first nozzle.

6. In a fluid mixing device, a body member having walls defining a confluence chamber and a pair of inlet chambers on opposite sides thereof, ports in said walls connecting said confluence chamber with said inlet chambers, a valve rod in said confluence chamber, a valve for the port of one of said inlet chambers slidably mounted on said rod, a valve for the port of the other inlet chamber fixed on said rod, spring means urging both of said valves toward closed positions against their respective ports, said first valve being opened by fluid pressure in said one inlet chamber to maintain a pressure differential between said one inlet chamber and said confluence chamber when the pressure in said confluence chamber is reduced by the withdrawal of fluid therefrom, a servo-motor diaphragm operative on said rod to open said second valve, one side of said diaphragm being exposed to the pressure of fluid from said confluence chamber and the other side of said diaphragm forming one side of a diaphragm chamber, a thermostatic element responsive to the temperature of fluid from said confluence chamber, a receiving orifice connected with said diaphragm chamber, a nozzle connected with said one inlet chamber and directed toward said orifice, a vane between said nozzle and orifice actuated by said thermostatic element in movement transversely of said nozzle, a blade connected with said vane and having a reacting surface perpendicular to the direction of movement of the vane, and a nozzle connected with said one inlet chamber and directed toward said blade in a direction to cause a jet from said nozzle to move said vane toward said orifice.

7. A fluid mixing device comprising a housing having inlet chambers adapted to be connected to pressure sources of supply for two fluids to be mixed, an outlet connection in said housing communicating with a confluence chamber for said fluids, ports having valves arranged to control the admission of said fluids from said inlet chambers to said confluence chamber, a diaphragm operatively connected with said valves, one side of said diaphragm being exposed to the pressure of the mixed fluids in said housing, a diaphragm chamber enclosing the other side of said diaphragm, an orifice exposed to the fluid pressure of the mixed fluids connected with said diaphragm chamber, a nozzle connected to one of said inlet chambers directed toward said orifice, a condition responsive vane movable transversely between said orifice and nozzle, and a nozzle exposed to the pressure of the mixed fluids connected with said one inlet chamber and arranged to discharge a jet for moving said vane toward said orifice and first nozzle in accordance with the pressure drop between said one inlet chamber and the mixed fluids.

8. In a condition responsive fluid mixing device having an inlet valve controlled by a fluid pressure operated servo-motor, an orifice exposed to the pressure of the mixed fluids and connected with said servo-motor, a nozzle supplied by a source of one of said fluids at inlet pressure and arranged to direct a jet of said fluid into said orifice, a condition responsive vane unit movable toward and away from intercepting position with respect to said jet, and a second nozzle connected to said fluid source and arranged to direct a jet against said vane unit in a direction to move said vane toward intercepting position to compensate for variations in said pressure of the mixed fluids under variations in the rate of flow of the mixed fluids.

References Cited in the file of this patent

UNITED STATES PATENTS

| | | |
|---|---|---|
| 1,291,007 | Jarvis | Jan. 14, 1919 |
| 1,901,268 | Snediker | Mar. 14, 1933 |
| 1,953,406 | Hodgson | Apr. 3, 1934 |
| 1,996,330 | Goshaw | Apr. 2, 1935 |
| 2,004,904 | Peo et al. | June 11, 1935 |
| 2,053,797 | King | Sept. 8, 1936 |
| 2,127,162 | Beauregard | Aug. 16, 1938 |
| 2,159,129 | Brush | May 23, 1939 |
| 2,159,819 | Snediker | May 23, 1939 |
| 2,308,165 | Fields | Jan. 12, 1943 |
| 2,415,994 | Curtis | Feb. 18, 1947 |
| 2,618,288 | Catheron | Nov. 18, 1952 |
| 2,725,040 | Harris | Nov. 29, 1955 |

FOREIGN PATENTS

| | | |
|---|---|---|
| 136,226 | Switzerland | Oct. 31, 1929 |
| 500,864 | Germany | June 27, 1930 |
| 704,479 | France | Feb. 23, 1931 |